United States Patent [19]

Anderson et al.

[11] 4,118,114

[45] Oct. 3, 1978

[54] LOW-GLARE OVERHEAD PROJECTOR

[75] Inventors: Raymond H. Anderson, Saint Mary's Point; Gregory S. Lewer, New Scandia Township, Washington County, both of Minn.

[73] Assignee: Minnesota Mining and Manufacturing Company, Saint Paul, Minn.

[21] Appl. No.: 698,116

[22] Filed: Jun. 21, 1976

Related U.S. Application Data

[63] Continuation of Ser. No. 499,138, Aug. 21, 1974, abandoned.

[51] Int. Cl.² .............................................. G03B 21/14
[52] U.S. Cl. .............................. 353/38; 353/DIG. 3; 353/102
[58] Field of Search ............. 353/38, 102, 22, DIG. 3; 350/167, 276 R, 211, 128; 240/41.4 R, 106 R

[56] References Cited

U.S. PATENT DOCUMENTS

| | | | |
|---|---|---|---|
| 2,115,178 | 4/1938 | Rolph | 240/106 R |
| 2,543,561 | 2/1951 | Tracy | 353/121 |
| 2,726,573 | 12/1955 | Maloff | 350/211 |
| 3,209,646 | 10/1965 | Appledorn | 353/102 |
| 3,366,005 | 1/1968 | Benedict | 353/119 |
| 3,479,117 | 11/1969 | Tronnier et al. | 353/102 |
| 3,511,563 | 5/1970 | Erwin | 353/38 |
| 3,580,661 | 5/1971 | Cooper | 350/128 |
| 3,712,713 | 1/1973 | Appledorn | 350/167 |
| 3,747,488 | 7/1973 | Bennett | 353/102 X |
| 3,830,556 | 8/1974 | Bratkowski | 350/167 |

FOREIGN PATENT DOCUMENTS

| | | | |
|---|---|---|---|
| 1,663,875 | 9/1953 | Fed. Rep. of Germany | 350/211 |
| 175,414 | 2/1922 | United Kingdom | 40/130 B |
| 561,540 | 5/1944 | United Kingdom | 350/211 |

*Primary Examiner*—Harry N. Haroian
*Attorney, Agent, or Firm*—Cruzan Alexander; Donald M. Sell; John C. Barnes

[57] ABSTRACT

An overhead projector that uses as a condensing lens a linear echelon lens structure comprising a combination of linear echelon lens elements between the light source and stage of the projector to minimize glare emanating from the condensing lens.

12 Claims, 16 Drawing Figures

LOW-GLARE OVERHEAD PROJECTOR

This is a continuation, of application Ser. No. 499,138 filed Aug. 21, 1974 now abandoned.

BACKGROUND OF THE INVENTION

1. Field of the Invention

The present invention relates generally to improvements in overhead projectors and in one aspect to an improved condensing lens construction to reduce glare from the stage of overhead projectors.

2. Description of the Prior Art

A particularly useful overhead projector, which is generally described in U.S. Pat. No. 3,126,786 comprises in optical alignment a transparent horizontal stage on which transparencies are laid, a source of intense illumination below the stage, an echelon lens structure comprising two annular echelon lenses disposed between the stage and the source of illumination, and a projection lens located above the stage. The echelon lens structure functions as a condensing lens, while the projection lens functions to form an image on a projection screen of the stage and of any transparency laid thereon. Usually a person who is using the projector stands at the side or rear of the projector so that he or she can conveniently change transparencies, point to significant portions of a transparency, or make marks on a transparency.

A problem with overhead projectors as described is that a region of concentrated glare is visible to the user when he or she looks at the transparency or uncovered stage. This glare, which causes eye strain and discomfort to the user, arises because a small portion of the light transmitted by the echelon lens structure is not controlled. FIG. 1 of the accompanying drawing (which is a fragmentary cross sectional schematic view of an annular echelon lens structure taken along a plane through the lens, which plane includes the optic axis of the lens), illustrates the path of controlled and uncontrolled light rays through two annular echelon lenses 11 and 12. Each annular increment or ridge 13 of the annular echelon lenses comprises a particonical working surface 14, a blind riser 15, and outer and inner edges, 16 and 17, at which the working surface and adjacent risers are joined. A ray of light 18 which is not reflected and does not strike the riser is said to be controlled, and the working surfaces are configured to refract all controlled light rays toward a substantially common focus and through the projection lens.

Examples of uncontrolled light rays in the plane illustrated in FIG. 1 are identified as light rays 20, 21, and 22. Light rays 20 and 21 are uncontrolled because they are reflected rather than refracted at interfaces between the air and the lens material. Light ray 22 is uncontrolled because it is diffracted at the edge 17. Due to the relatively small size of the source of illumination used in an overhead projector, all the uncontrolled (as well as controlled) light rays tend to be nearly coplanar with the optical axis of the echelon lenses 11 and 12 in the infinite number of planes extending radially from the optic axis. Thus, uncontrolled light rays lie in planes extending radially in all directions from the optic axis of the lenses 11 and 12. Within each plane uncontrolled light rays are moving in an infinite number of directions since the angle alpha ($\alpha$) at which the uncontrolled rays emanate from the lens structure may have any value over the range 0° to 180°.

When a user of the projector looks at the stage 24 of the projector or at a transparency on the stage, the user's eye "E" receives a light glare emanating from a propeller-shaped area illustrated by lines 28 the center of which is at the center of the lenses with the blades extending in directions in the same plane 25 as the eye of the user and the optic axis.

This glare is produced by the uncontrolled light emanating from the lenses in the plane of the observer and passing through the stage or transparency. As the user moves his position in a circle around the stage, as to a position E', he sees similar uncontrolled light in a different radial plane 27. In practice, no matter where the user stands, because of the annular symmetry of the lens the users eye will be in a plane with the optic axis and will see the glare resulting from the uncontrolled light.

In U.S. Pat. No. 3,511,563, a structural modification for reducing this glare in an overhead projector is described. This structural modification, which has been used with commercial satisfaction, includes an internally louvered film interposed between the stage and the condensing lens. The louvers are arranged in a spaced side-by-side relation and act as a set of "venetian blinds," which are substantially parallel to the path of controlled light rays and thus pass such light rays while blocking uncontrolled light rays that would otherwise travel to the user when in a normal user position.

There are at least three disadvantages in the described structural modification. First, it adds cost to the projector, especially when the louvered film is contoured as a shallow trough as is sometimes necessary for best results. Such a contouring slants the louvers at the outer edges of the film so the louvers are more closely parallel to the path of the controlled light rays; but the contouring of the film and the structure for supporting the contoured film add to the cost of the projector.

A second disadvantage is that the use of the film requires a greater distance between the condensing lens and the stage either to permit the contouring or to allow sufficient space between the condensing lens and the film in order to prevent Moire patterns on the screen.

The third disadvantage is that the louvers, the exterior faces of the louvered film, and the transparent material of the louvered film cause a reduction on the order of 15% to 40%, typically about 30%, in the overall transmission of controlled light through the projector. To compensate for this reduction in transmission of light, more powerful sources of illumination are used in the projector, leading to greater initial and replacement costs, greater cooling requirements, and greater electrical power consumption.

In summary, despite the great advantage of reduced glare provided by the louvered film, the named disadvantages lead to a desire for other ways to solve the problem of glare.

SUMMARY OF THE INVENTION

An overhead projector of the present invention, which comprises, in optical alignment, a light source, a surface on which a transparency is laid for projection, a lens structure located between the light source and said surface, and a projection head for focusing an image of a said transparency to a projection screen, is characterized in that said lens structure comprises at least two linear echelon lenses oriented with respect to one another so that the lens structure achieves substantially the same function of collecting and focusing light from the light source as conventional annular echelon lenses.

However, the uncontrolled light does not emanate from the combination of linear echelon lenses in an infinite number of planes about the optic axis of the combination as with annular echelon lenses. The result is that a user of the projector is not disturbed by the same "propeller" type concentrated glare from the linear echelon condensor lens structure and in fact can view the transparency on the stage from a normal user position without any disconcerting effects.

FIGS. 3 and 4 illustrate how the elimination of the disturbing glare is achieved. FIG. 3 is a schematic representation of a single element linear echelon lens 29 having an axis of symmetry 30 (cylinder axis) extending parallel to the ridges or grooves of the linear lens 29, which lens is capable of focusing light from a point source 31 to a "line" focus 32. If a screen or paper of a size illustrated at 33 were placed parallel to the lens with the line focus 32 falling on its surface, uncontrolled light rays, caused by reflection and diffraction as explained for annular echelon lenses, emanating from the surface of lens 29, as exemplified by light ray 34, will form a band of light along the paper 33 as illustrated at 35. The band 35 will have a width equal to the length of the line focus 32 and will extend laterally to either side of the line focus 32.

FIG. 4 shows two orthogonally oriented linear echelon lenses 37 and 38 positioned in parallel and aligned with a source of light 39 to focus light gathered from said source to the focus 40 which is the image of the light source 39. Again, a screen or paper 41 placed in a plane perpendicular to the optic axis (defined by focus 40, the centers of lenses 37 and 38 and the light source 39) and at the focus 40 would show a bright spot or area at the focus 40 and an observer would see two bright strips 42 and 43 on the paper 41 formed by the uncontrolled light. Each of the strips 42 and 43 is caused by a different one of the lenses 37 and 38 and the strip caused by each lens is narrowed because the other lens acts to actually focus the uncontrolled rays. As discussed with respect to FIG. 3, each strip is found to be approximately as wide as the corresponding dimension of the focus 40 on the plane of paper 41. Some uncontrolled light rays fall within the quadrants between the strips 42 and 43 but this light is not intense enough to be disturbing to a user viewing the lenses or a stage of a projector from the normal position E. Typically, in a preferred overhead projector of the invention, the strips are approximately 4 centimeters wide at the focal plane or plane of paper 41. So long as the user is in a normal position and is looking at the stage from a position between the symmetry or cylinder axes of the lenses, such as axes 44 and 45, and not in a direction perpendicular to an axis of a lens element, a substantially reduced amount of glare is received from the echelon lens structure when viewing the stage or a transparency on the stage.

Preferably a projector of the invention includes at least four separate linear echelon lenses, each lens comprising a smooth planar surface and a surface formed with parallel ridges and grooves. The four lenses are generally oriented in pairs so that the axis of one lens of a pair is substantially perpendicular to the axis of the other lens of the pair, and each pair is oriented so that the axes of one pair lie at an angle of between 5 and 45 degrees relative to the nearest axes of the other pair. However, linear echelon lenses can also be arranged in other arrangements according to the invention, such as triplets in which the axis of each lens forms an angle of about 60° to the axes of the other lenses.

Although an overhead projector of the invention includes more echelon lenses than a conventional projector, they are conveniently manufactured. Although light losses result from the additional lenses, the losses previously resulting from the use of an internally louvered film are eliminated. Furthermore, the linear echelon lens structure may be positioned so that its upper surface can be used as the stage of the projector, in order that the stage be eliminated. The overall result is potentially lower cost, increased or comparable transmission of controlled light, and reduced height of the projector.

ANCILLARY PRIOR ART

The use of crossed cylinder lenses is known to achieve the general effect of a single spherical or aspherical lens; see the publication by I. Pitman of London, titled "Technical Optics" by Louis E. Martin, P. 312 et seq.. Further, crossed linear echelon lenses have previously been used; see Cooper, U.S. Pat. No. 3,580,661 issued May 25, 1971, and also Maloff, U.S. Pat. No. 2,726,573 issued Dec. 13, 1955, where rear projection screens are described.

However, none of these prior art references suggests that the glare problem associated with the annular echelon lenses in overhead projectors can be reduced by the use of crossed linear echelon lenses. Instead, the projector art has tended to ignore the problem, or to use means of limited effectiveness, such as shields between the stage and the user's eyes or other approaches to overcome the glare problem, approaches which are more expensive and which reduce the amount of light transmitted through the condensing lens structure.

DESCRIPTION OF THE DRAWINGS

As previously noted.

FIG. 2 being a schematic top view of the stage of a conventional overhead projector;

FIG. 3 being a schematic perspective view of a single linear echelon lens, a point source of light, and the focal plane of the lens; and FIG. 4 being a schematic perspective view of two linear echelon lenses, a point source of light, and the focal plane of the lenses.

DETAILED DESCRIPTION

Figure 1:
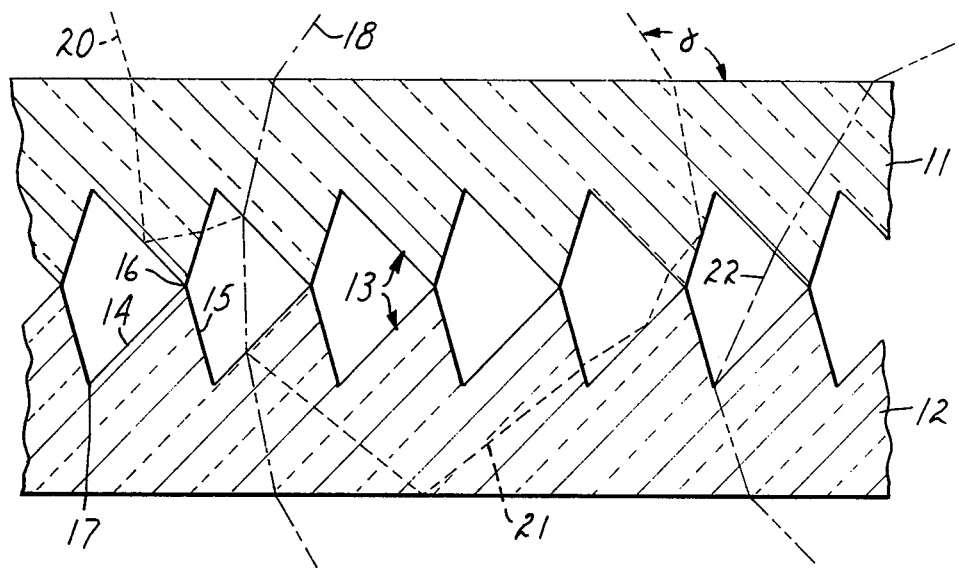
FIGS. 1-4 are schematic views illustrating problems in the prior art and principles on which the present invention is based, FIG. 1 being a fragmentary cross sectional schematic view taken along a plane including the axis of two annular echelon lenses as used in a conventional overhead projector.
Figure 2:
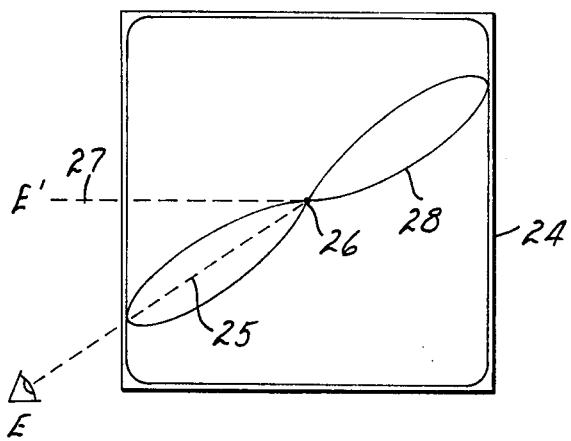
Figure 5:
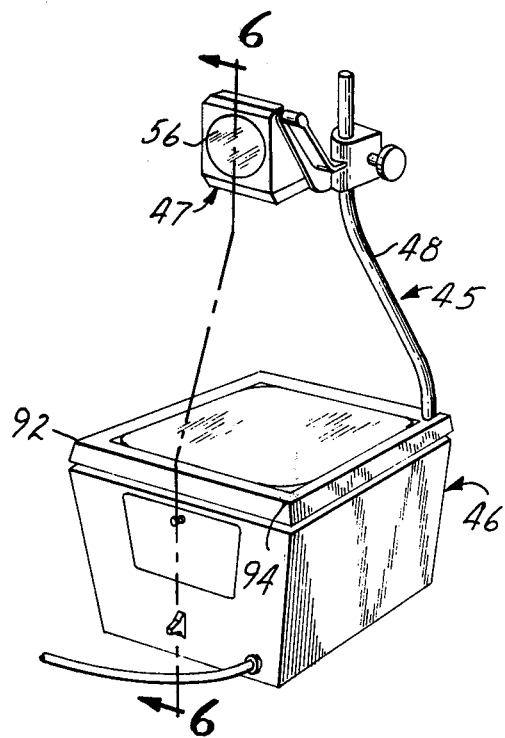
FIG. 5 is a perspective view of an overhead projector of the invention.
Figure 3:
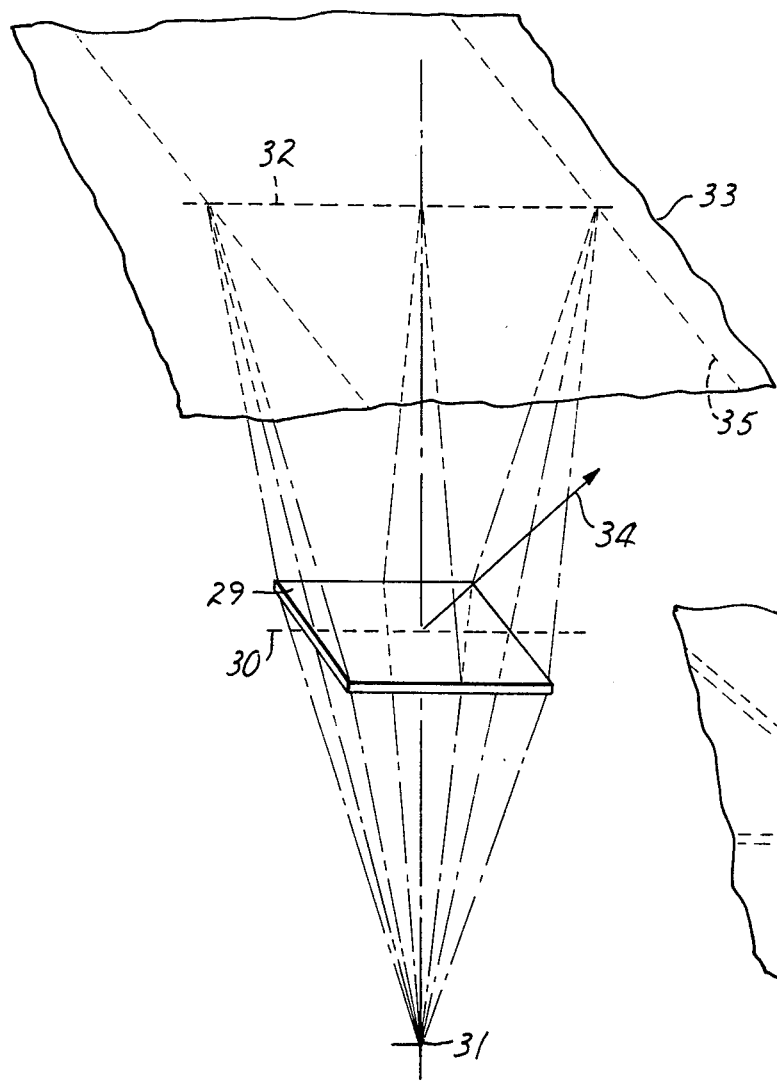
Figure 4:
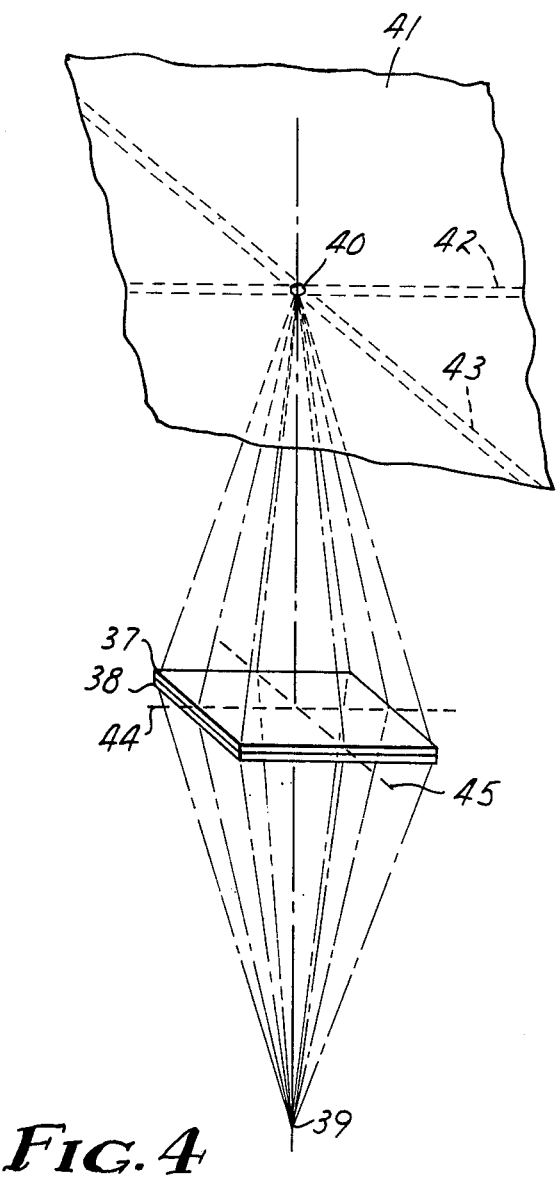
Figure 6:
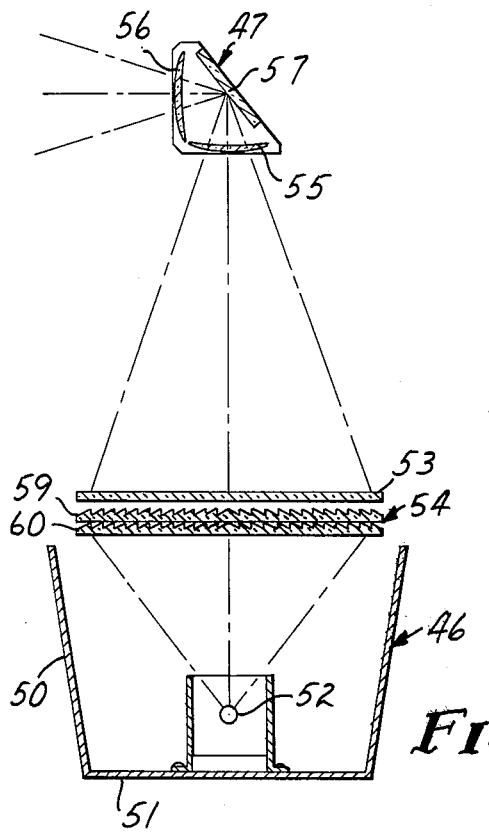
FIG. 6 is a sectional view of the overhead projector shown in FIG. 5 taken along the line 6—6 of FIG. 5.

The illustrative overhead projector of the invention 45 shown in FIG. 5 includes a base 46 and a projection lens 47, which is supported above the base on a rod 48. As shown in FIG. 6, the base 46 includes side walls 50, a bottom wall 51, a projection lamp 52, a transparency supporting surface or stage 53, and a linear echelon lens structure 54. As also shown in FIG. 6, the projection lens 47, commonly known as the "projection head," includes a pair of similar simple positive meniscus lenses 55, 56, and a mirror 57.

Figure 7:
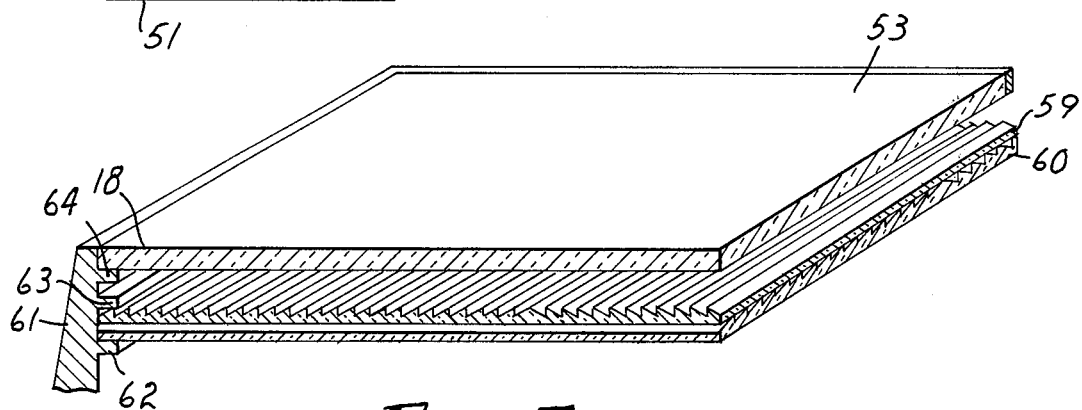
FIG. 7 is a fragmentary perspective view, partially in section, of the stage and lens structure of the overhead projector of FIG. 5.

The linear echelon lens structure 54, which is shown best in FIG. 7, includes linear echelon lenses 59 and 60 supported in a frame member 61 between flanges 62 and 63. The frame member 61 also supports the stage 53 on a flange 64. In general the linear echelon lenses will be held together in one air-tight sealed structure to prevent dust from entering between the lenses. Often the individual echelon lenses will be provided with planar borders around their edges, and these borders will be adhered together, as e.g. by solvent sealing by thermal fusion or other suitable techniques.

While the lenses 59 and 60 each have a rectangular outline the parallel ridges and grooves forming the optically active refracting surfaces and risers and any linear axis of the lens which is parallel to the ridges and passes through the optic center of the lens, hereinafter identified as the "cylinder axis" are not necessarily parallel to the edges of the lenses. The cylinder axis of the lenses 59 and 60 may be disposed at an angle of between 90° and 85° when the lenses are sealed at the borders and the linear axis of one of the lenses will always be at an angle to a diagonal of the rectangular stage 53.

While the structure shown in FIG. 7 is useful, a preferred linear echelon lens structure includes more than two linear echelon lenses to minimize aberration problems that are inherent with crossed cylinder lenses of relatively large aperture. The same kind of aberration is observed whether standard cylinder lenses or their echelon counterparts are used to construct a crossed cylinder lens, and may be termed "crossed-cylinder aberration."

Figure 8:
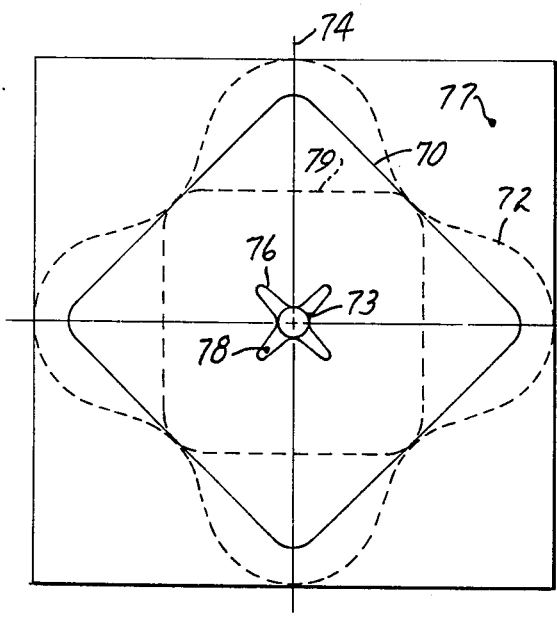
FIG. 8 is a top schematic view of a pair of linear echelon lenses.
Figure 9:
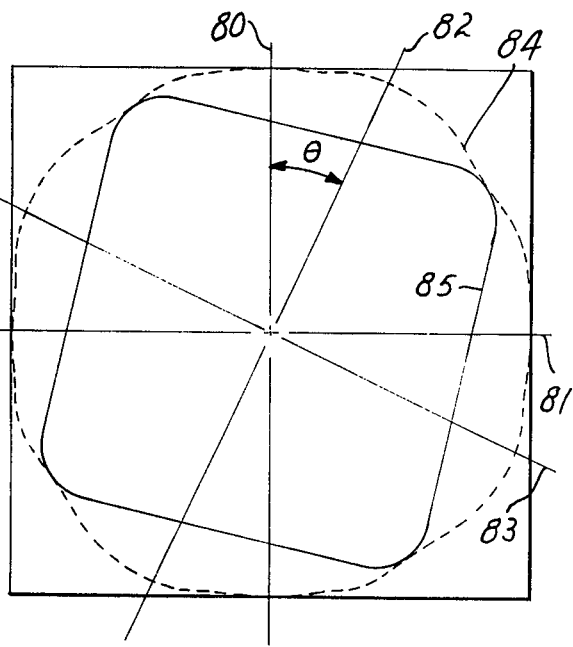
FIGS. 9 and 10 are top schematic views of a structure comprising four linear echelon lenses.

FIGS. 8 and 9 illustrate the effect of crossed-cylinder aberration and the improvement in crossed-cylinder aberration achieved by the use of four lenses respectively. FIG. 8 is a top view of the two-element lens structure 54 of the invention as pictured in FIG. 7. Light passing through the lens structure 54 within the area generally defined by the four-lobed curve 72 is focused to a relatively small area within an image circle 73 (on the focal plane located a suitable distance above the lens structure). The lobes of the curve 72 are generally coincident with the cylinder axes 74 and 75 of the two linear echelon lenses 59 and 60 that comprise the lens structure 54. Light passing through the corners of the lens structure outside of curve 72 is bent somewhat too much, causing it to image outside of circle 73 but within the four-lobed curve 76. For example, a ray of light passing through the lens structure at point 77 intersects the image plane at point 78. If corrective measures are not taken, the image generally defined by curve 76 may be too large to pass unobstructed through the projection lens, causing portions of the projected image of the stage to appear colored or dark. The pair of lenses illustrated afford a reduced usable condensing area as illustrated by dotted lines 79 wherein the cylinder axes 74 and 75 would be substantially perpendicular to the edges of the area. If the axes 74 and 75 are rotated 45° to the edges a larger useful area as indicated by solid line 70 can be obtained. However, as will be explained later this construction is not preferred since it causes glare to be directed toward the user.

FIG. 9 illustrates the use of an alternative lens structure which includes two pairs of crossed linear echelon linese positioned to alleviate crossed cylinder aberration. The cylinder axis of each lens of a pair — 80 and 81 and 82 and 83 respectively — is at substantially right angles to the other axis of the pair. But the cylinder axes of the lenses of one pair form an angle theta ($\theta$) to the nearest axes of the lenses of the other pair, thereby causing areas of relatively high refracting power to be positioned over areas of relatively low refracting power. The light rays that are brought to a substantially common focus by such an arrangement pass through the lens structure within a curve that may be represented by the curve 84. Curve 84 circumscribes a larger area than the curve 72 in FIG. 8, is not so deeply lobed, and hence affords a larger usable condensing area 85 from similar lens sheets.

Figure 10:
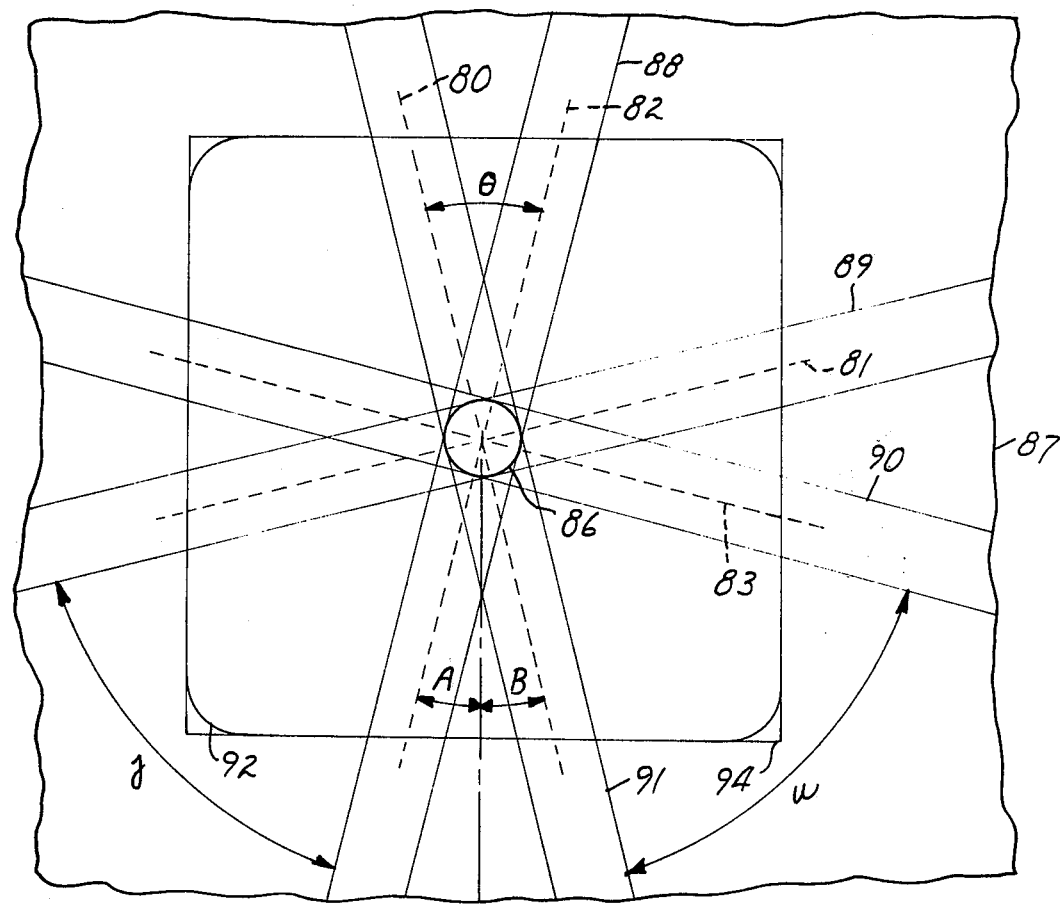

The angle $\theta$ is preferably at least 5° to minimize Moire patterns and at least 10° to obtain a significant increase in the extent of the useful area 85. The optimum angle for increasing the useful area 85 and to minimize Moire patterns would be 45°. However, the angle 45° has the disadvantage in that the low-glare regions are smaller than desirable. Angle $\theta$ may be optimized to produce an acceptable range as illustrated in FIG. 10, which figure is a top view like FIG. 9 of a four element linear echelon lens structure. A small light source (not shown) is located below the structure. Light from the source passes through the lens structure and is brought to a focus within an area indicated by circle 86 on a spaced plane 87. The uncontrolled light impinges on plane 87 within four strips 88, 89, 90, and 91 of somewhat different width, but approximately as wide as the image circle 86. Each strip results from a fan of uncontrolled light perpendicular to the cylinder axis of one lens, as previously explained. For example, strip 88 is caused by one lens of the four elements and this strip lies perpendicular to the cylinder axis 83 of that lens. The strip is modified to its narrower width by the other lenses of the structure.

Because the user's eyes are typically at a height above the lens structure corresponding approximately to the position of the image plane 87 and image circle 86, the angles gamma ($\gamma$) and omega ($\omega$) define regions, hereinafter referred to as low-glare regions, within which the user's eyes are not in the path of a significant amount of uncontrolled light. It is desirable to have these regions as large as possible and to have them located generally to the sides and out from the front corners 92 and 94, see also FIG. 5, of the projector i.e. those corners toward the user. As FIG. 10 indicates, an increase in the angle $\theta$ results in a decrease in the angles $\gamma$ and $\omega$ and hence in the extent of the low-glare regions. If $\theta$ is equal to 45°, the low-glare regions are not as large as desired, i.e. $\gamma$ and $\omega$ are only 45°, while it is desirable to have them 50° or larger. Therefore, in order to obtain a sufficiently large useful area of the lens structure, to reduce moire patterns, and to obtain sufficiently large low-glare regions, the angle $\theta$ is optimized between 25° and 35°. The orientation of the cylinder axes of the lenses relative to the exterior outline of the lens structure may be altered without changing $\theta$ in order to obtain suitable orientation of the low-glare regions.

Figure 11:
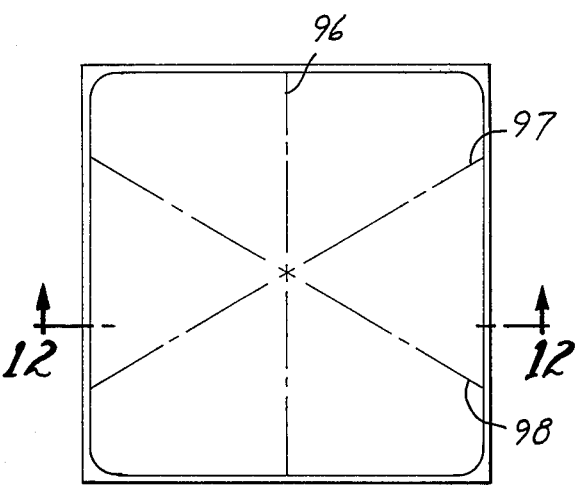
FIG. 11 is a top schematic view of a projector stage with the lens structure comprising a three element linear echelon lens structure.
Figure 12:
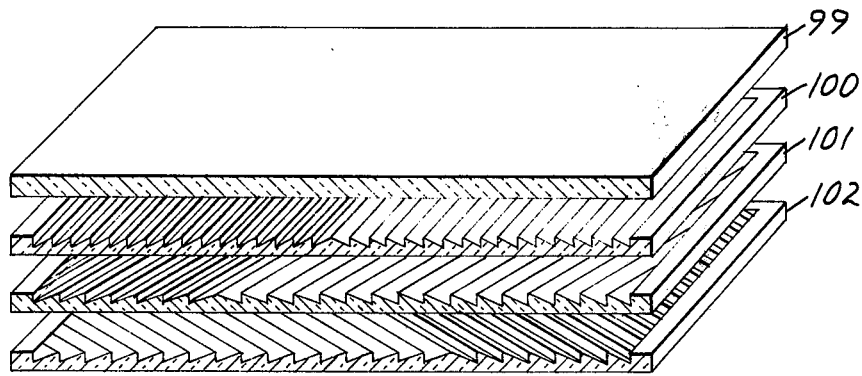
FIG. 12 is an enlarged exploded schematic perspective sectional view of the stage and lens structure of FIG. 11.

A further embodiment of the condensing lens of the invention includes three linear echelon lens elements, and such a structure is illustrated in FIGS. 11 and 12. As illustrated in FIG. 11 the three cylinder axis 96, 97, and 98 are positioned to intersect at angles of substantially 60° relative to each other when the projector stage is viewed from above as in FIG. 11. Looking at the lenses, in an exploded sectional view as in FIG. 12, the structure comprises a cover sheet 99 which may be used as the stage and this cover sheet may be formed of glass, polymethyl methacrylate or polycarbonate. It is secured around its edges to the border of the upper lens 100, which lens is oriented with its cylinder axis 96 perpendicular to the front and rear edges of the projector stage. Lens 101 has a border and is sealed between lens 100 and a third lens 102. Lenses 101 and 102 have their respective cylinder axes 97 and 98 rotated with respect to each other and to the axis 96. This triplet lens structure has been found to be capable of achieving a focusing effect similar to that achieved by annular echelon lenses.

Figure 13:
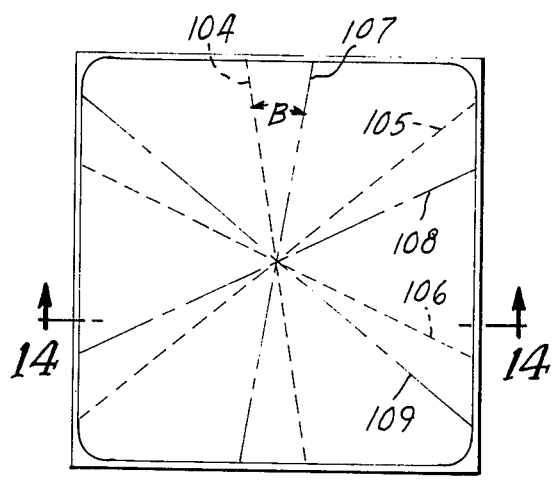
FIG. 13 is a top schematic view of a projector stage with the lens structure comprising six lens elements.

A still further embodiment of the lens structure suitable to practice the present invention is a structure utilizing a pair of triplet lenses as described above wherein six ridged surfaces are formed on five elements. Referring now to FIG. 13 the six ridged surfaces have cylinder axes represented as axes 104, 105, 106, 107, 108, and 109. The axes 104, 105, and 106 represent the cylinder axes of one triplet and are each at 60° to one another and the cylinder axes 107, 108, and 109 are the axes of the second triplet and are also oriented at 60° to one another. The axes of the two triplets are then rotated with respect to each other through an angle beta ($\beta$) of about 10°. With this orientation low glare regions adjacent the front corners of the stage of 50° are obtained. The regions are defined by an arc around the front corners between bands of uncontrolled light which are perpendicular to the axes of the ridged surfaces. It is also indicated in this embodiment that two linear echelon lens surfaces are combined in an integral sheet. The echelon lens ridges of one lens is on one surface of the sheet and the echelon lens ridges of the other lens are on the opposite surface of the sheet. This reduces the number of refractive surfaces in the lenses and would reduce the losses due to reflection at the interfaces.

Figure 14:
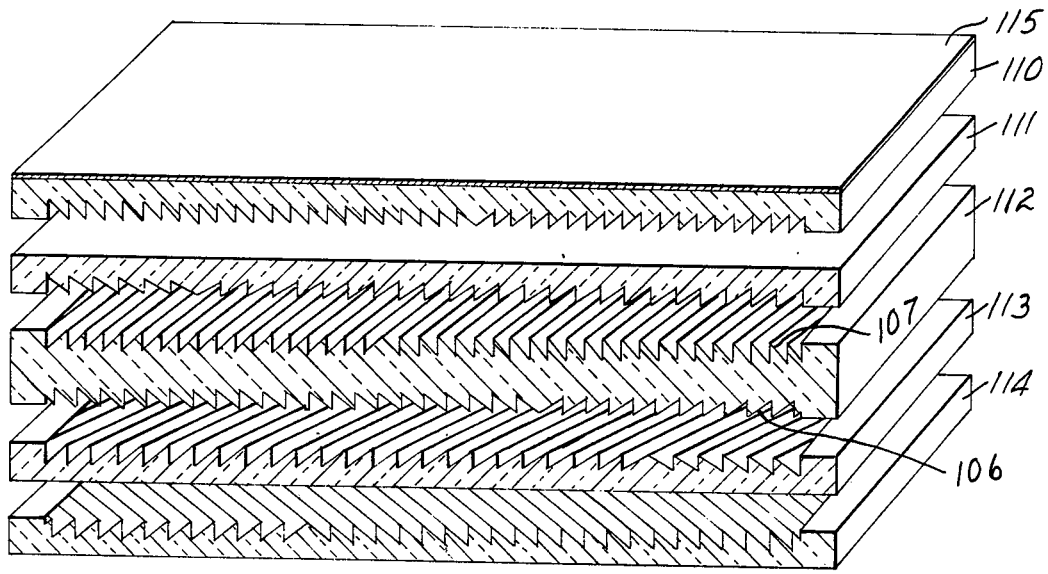
FIG. 14 is an enlarged exploded schematic perspective sectional view of an alternative lens structure having six linear echelon lens surfaces.

The exploded section of this structure is shown in FIG. 14 and comprises five sheets 110, 111, 112, 113, and 114. The sheet 112 is formed with the linear echelon ridges on each face and the respective cylinder axes 107 and 106 are angularly related to each other.

In this lens structure of FIGS. 13 and 14 the smooth flat upper surface of the lens 110 may be utilized as the stage for the projector. To protect the polymeric material from which the lens element 110 may be formed, a transparent hard coat material 115 may be applied to the smooth upper surface of the lens 110. This hard coat material may be, for example, a silicon backbone fluoropolymer such as sold by E. I. duPont deNemours of Wilmington, Delaware under the trade designation "Abcite".

Figure 15:
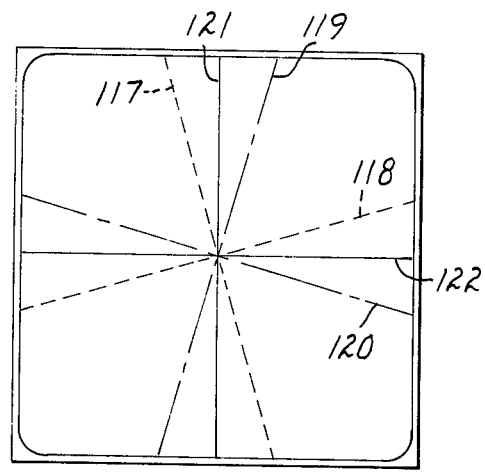
FIG. 15 is an enlarged schematic cross-sectional view of a further embodiment of a lens structure for the invention.

FIG. 15 discloses still a further modification of a lens structure suitable for use in the present invention. This is a six element construction wherein three pairs of linear echelon lens elements are utilized. Within each pair, the cylinder axis of each lens of that pair will be perpendicular to the cylinder axis of the other element of that pair. The axes 117 and 118 of the one pair are rotated counterclockwise by an angle of 10° to 15° from the axes 121 and 122 of the second pair. The third pair has its axes 119 and 120 rotated clockwise 10° to 15° from the axes 121 and 122 of the second pair. With the pairs of lenses oriented as described, the low-glare regions on the projector will have an angular extent of 60° to 70°.

Figure 16:
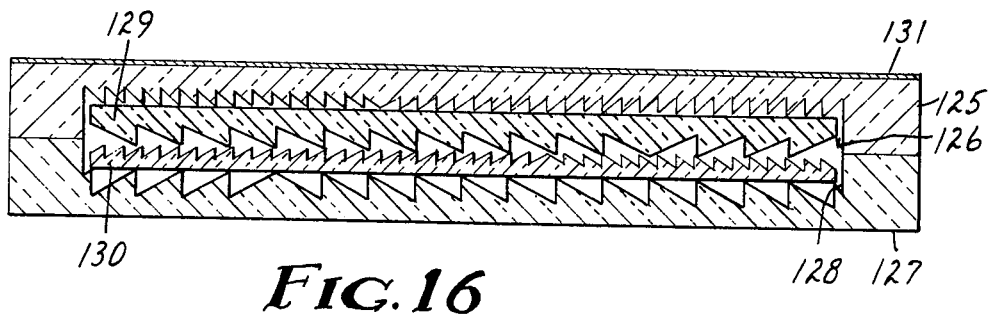
FIG. 16 is an enlarged schematic cross-sectional view of still another embodiment of a lens structure according to the invention.

FIG. 16 discloses a preferred embodiment of a condensing lens structure appropriate for the present invention. This structure utilizes two pairs of linear echelon lenses with the pairs combined to provide a cylinder axis orientation similar to the orientation illustrated in FIG. 10. In this structure however the upper lens 125 is provided with the ridges and grooves in a central recess 126, thus providing with a mating lens 127 having a similar recess 128 a cavity therebetween. In this cavity, formed upon the joining of the borders of the lenses 125 and 127, may be disposed thin lenses 129 and 130 which form the other two lenses of the structure. The lenses are preferably formed with ridges and grooves such that lenses 125 and 129 form one optical pair and lenses 127 and 130 form the other optical pair of the lens structure. In this structure the ridged echelon surfaces of the upper pair of lenses 125 and 129 are disposed toward the source of light and the echelon surfaces of the lenses 127 and 130 are on the sides of the sheets away from the source.

This lens structure may have a sheet 131 of glass or optically clear polymeric material, such as clear polycarbonate, adhered to the smooth upper surface of the lens 125. This sheet 131 provides a rigid support for the lens structure and a hard surface upon which to place transparencies without danger of marring or scratching the surface. This sheet 131 is preferably bonded to the lens 125 by an optical cement such as alkylacrylates and N-vinyl-2-pyrrolidone copolymer.

The linear echelon lenses are generally made by embossing, pressing or molding a synthetic polymer material such as polymethyl methacrylate. Other useful polymeric materials are cellulose acetate butyrate and polycarbonate.

The protective coating or sheet of rigid material on the smooth upper surface of the upper element is most important in the structures where the lenses are formed of polymethyl methacrylate.

In the lens structures useful in the present invention, the particular placement of the lenses with respect to each other and the light source have some preferred orientation. It is however not an inflexible orientation and the manner is which the lens elements of a four-element lens structure are positioned may vary. For example, if a four-lens structure comprises lenses 1, 2, 3, and 4 with 1 and 2 comprising one pair of orthogonal lenses and 3 and 4 comprising the second pair, then the lenses may be stacked in various orders, such as 1, 2, 3, 4, or, 1, 3, 2, 4. The position of the cylinder axis however does not change when the order of the lenses is changed.

As an example of practice of the invention, a useful projector was prepared including a condensing lens structure comprising four 4 millimeter thick sheets of polymethyl methacrylate, each provided on one of its faces with ridged linear echelon lens increments. The cylinder axes of the four lenses were arranged substantially as shown in FIG. 10, the angle θ measuring 30° and the angles A and B on each side of the center line of the stage measuring 15°. The lenses were identical to each other, each being an analog of an approximately F 1.1 plano-convex standard cylinder lens. The ridges were at a frequency of 40 per centimeter. The lower two lenses had the ridges on the upper side away from the light source, the upper two lenses had the ridged surfaces facing the light source, i.e., face downward, and the upper surface of the upper lens served as a stage, thereby eliminating the need for a separate sheet of material to serve as a stage.

Having thus disclosed a preferred embodiment of the invention and modifications, it is to be understood that other modifications may be made without departing from the present invention as defined by the appended claims.

What is claimed is:

1. In an improved overhead projector comprising in alignment along an optical axis a source of illumination, a rectangular support for positioning a transparency to intercept the optical axis, an echelon lens structure located between the source and the support for focusing light from the source, and a projection lens for receiving focused light from the echelon lens structure and focusing a planar image of the transparency, the improvement wherein the echelon lens structure comprises a plurality of linear echelon lenses, each of which comprises a planar, optically transparent sheet having ridges and grooves in a first one of first and second major surfaces on opposite sides thereof; the ridges and grooves extending parallel to one another along a linear axis; the linear axes of the lenses being disposed at predetermined angles relative to one another and oriented with each linear axes positioned at an angle to a diagonal of said rectangular support such that uncontrolled light emanating from said echelon lens structure is confined to narrow bands substantially perpendicular to said linear axis and not radiated along said diagonal of said support so uncontrolled light will not emanate from a corner of said support; and at least the linear echelon lens nearest the light source having the first major surface thereof facing away from the source of illumination.

2. An improved overhead projector comprising in alignment along an optical axis a source of illumination, a rectangular support for positioning a transparency to intercept said optical axis, a lens structure located between the source and the support for imaging the source at a projection lens for projecting an image of the transparency, said lens structure comprising at least three linear echelon lenses, each linear echelon lens comprising an array of ridges and grooves, each array being formed in a first one of first and second major surfaces formed on opposite sides of a planar, optically transparent sheet, one array to a surface; the ridges and grooves of each array extending parallel to one another to form a linear axis; the linear axes of the lenses being oriented at an angle relative to one another and to a diagonal of said rectangular support such that uncontrolled light emanating from said lenses is confined to narrow bands disposed at a like angle relative to one another.

3. The improved overhead projector recited in claim 2, wherein the linear axis of any ridged and grooved array lies at an angle of 55°–65° relative to the linear axes of the other two arrays such that uncontrolled light is confined to three narrow bands disposed at an angle of between 55° and 65° relative to one another.

4. The improved projector according to claim 2 in which the linear echelon lens structure comprises six linear echelon lenses oriented in pairs so that the linear axis of one lens of a pair is at an angle of between 85° and 90° to the linear axis of the other lens of the pair, the pairs being oriented relative to each other so that the smallest angles of the linear axes of one pair relative to the linear axes of the other pairs are between 5° and 20°.

5. The improved projector according to claim 2 in which the linear echelon lens structure comprises six linear echelon lenses oriented in triplets so that the linear axis of any lens of a triplet lies at an angle of between 55° and 65° relative to the linear axes of the other lenses of the triplet, and the smallest angles between the linear axes of one triplet and the linear axes of the other triplet are between 5° and 20°.

6. An improved overhead projector comprising in alignment along an optical axis a source of illumination, a support for positioning a transparency transverse to said optical axis, a lens structure located between the source and the support for focusing an image of the source at a projection lens, the improvement wherein the lens structure comprises at least two pairs of linear echelon lenses; each linear echelon lens comprising an array of ridges and grooves, each array being formed in a first one of first and second major surfaces on opposite sides of a planar, optically transparent sheet, one array to a surface; the ridges and grooves of each array extending parallel to one another to form a linear axis; the linear axes of each pair of the ridged and grooved arrays lenses being disposed at an angle of between about 85° and 90° relative to one another such that uncontrolled light emanating from each pair of lenses is substantially confined to two bands disposed at a like angle; and the linear axes of one pair of lenses being oriented relative to the linear axes of the other pair of lenses such that non-glare viewing regions are formed between the narrow bands and generation of moire patterns by said lens structure is substantially eliminated.

7. The improved projector according to claim 6 in which the pairs are oriented relative to each other so that the smallest angle between their respective linear axes is between 5° and 45°.

8. The improved projector according to claim 6 in which half of the lenses are oriented with their array of ridges and grooves facing away from the source of illumination and toward the support and half are oriented with their array of ridges and grooves facing toward the source of illumination, and wherein the half of the lenses that are oriented facing away from the source are the lenses that are closest to the source.

9. The improved projector according to claim 6 wherein the smallest angle between the respective linear axes of the two pairs of lenses is between 25° and 35°.

10. The improved projector according to claim 9, wherein the second major surface of the transparent sheet farthest from the light source faces toward the projection lens and serves as the support for transparencies.

11. The improved projector according to claim 10 wherein a sheet of glass or clear polymeric material is bonded to the second major surface of said farthest transparent sheet.

12. The improved projector according to claim 6, wherein the second major surface of the transparent sheet farthest from the light source faces toward the projection lens and serves as the support for transparencies.

* * * * *